United States Patent [19]

Harada et al.

[11] Patent Number: 4,569,979

[45] Date of Patent: Feb. 11, 1986

[54] PROCESS FOR PRODUCING A POLYMER OF AN INORGANIC ACID SALT OF MONOALLYLAMINE

[75] Inventors: Susumu Harada, Koriyama; Sakuro Hasegawa, Fujisawa, both of Japan

[73] Assignee: Nitto Boseki Co., Ltd., Fukushima, Japan

[21] Appl. No.: 669,457

[22] Filed: Nov. 7, 1984

[51] Int. Cl.[4] ............................................. C08F 4/04
[52] U.S. Cl. ............................... 526/218.1; 526/193; 526/204; 502/200
[58] Field of Search .................... 526/218.1, 193, 204; 502/200

[56] References Cited

U.S. PATENT DOCUMENTS

| | | | |
|---|---|---|---|
| 3,062,798 | 11/1962 | Lovett | 526/270 |
| 4,053,512 | 10/1977 | Panzer et al. | 260/567.6 P |
| 4,329,441 | 5/1982 | Bergthaller | 526/291 |
| 4,504,640 | 3/1985 | Harada et al. | 526/218.1 |

Primary Examiner—John Kight
Assistant Examiner—M. L. Moore
Attorney, Agent, or Firm—Bert J. Lewen

[57] ABSTRACT

The use of a radical initiator of azo compound type represented by the following general formula (I) enables polymerization of an inorganic acid salt of monoallylamine, whereby a polymer of an inorganic acid salt of monoallylamine having a high polymerization degree can be obtained in a high yield,

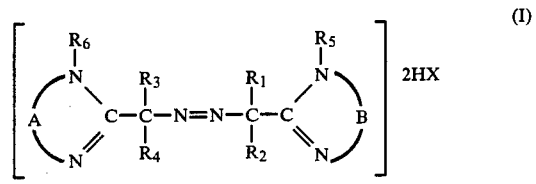

[In the above formula, A and B independently are an alkylene group of 2 to 3 carbon atoms which may have one or more substituents on the carbon atom or atoms; $R_1$, $R_2$, $R_3$, $R_4$, $R_5$ and $R_6$ may be same or different and independently are a hydrogen atom or a hydrocarbon group; and X is a monovalent anion selected from the group consisting of Cl, Br, $NO_3$, $HSO_4$, $H_2PO_4$, $HSO_3$, HCOO, $CH_3COO$,

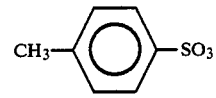

and $CH_3SO_4$.]

3 Claims, 1 Drawing Figure

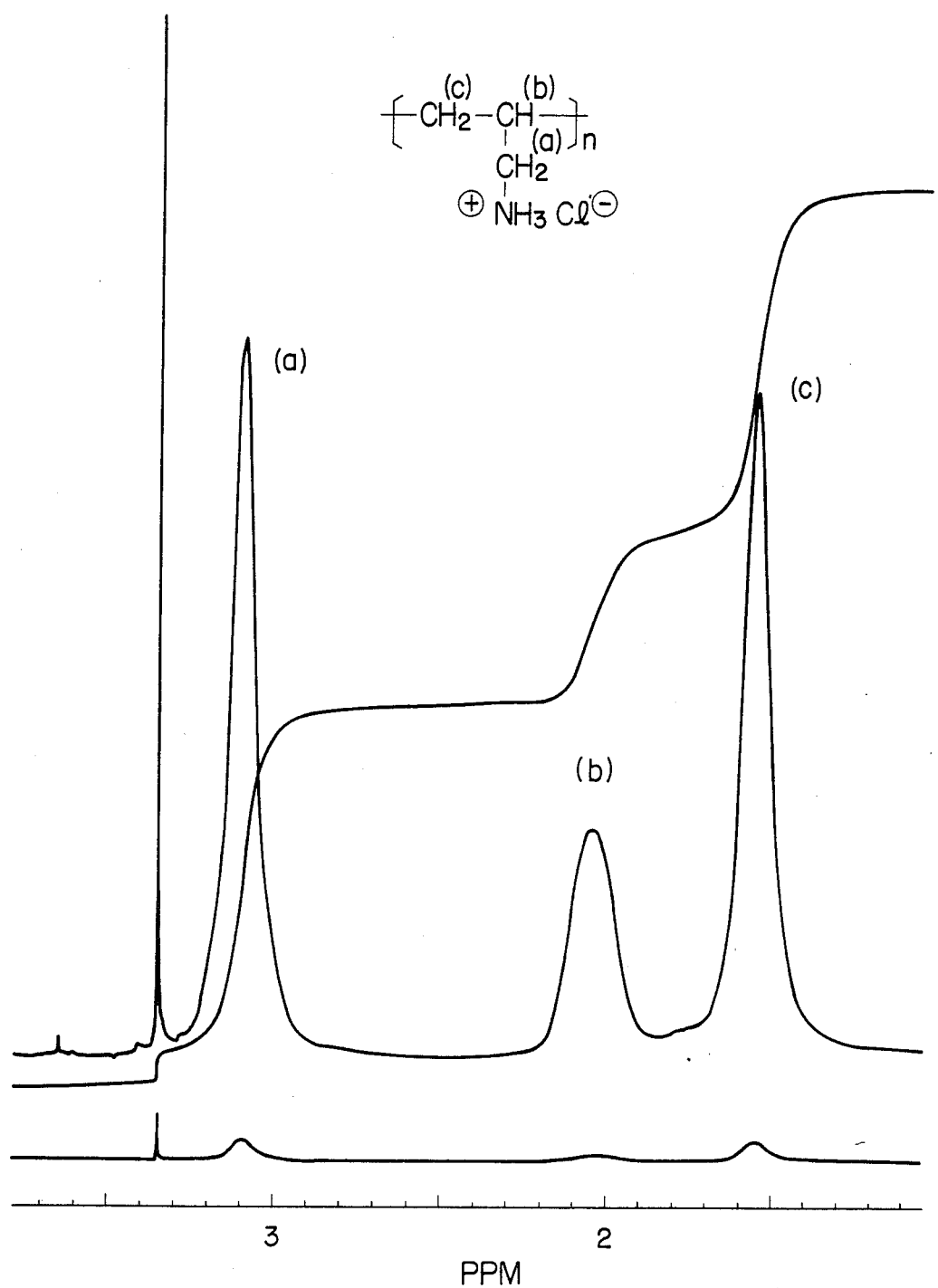

PROCESS FOR PRODUCING A POLYMER OF AN INORGANIC ACID SALT OF MONOALLYLAMINE

BACKGROUND OF THE INVENTION

(1) FIELD OF THE INVENTION

This invention relates to a process for producing a polymer of monoallylamine ($CH_2=CH-CH_2NH_2$).

(2) DESCRIPTION OF THE PRIOR ART

As is well known, allyl compounds are difficult to be polymerized with usual radical initiators and they only give a polymer having a low degree of polymerization in a low yield.

This is explained as being due to the occurrence of the self-termination reaction between allylic hydrogen atoms and radicals, and this reaction is usually called "allylic degradative chain transfer".

This fact is a common knowledge of polymer chemists, and is mentioned in many papers and textbooks [cf. for example, C. E. Schildknecht, "Allyl Compounds and their Polymers", Wiley-Interscience, 1973, pp. 29-30; and R. C. Laible, Chem. Rev. 58, (5), 807-843 (1958)].

Such is unexceptionally applicable also to monoallylamine which is a kind of allyl compound. Thus, monoallylamine hardly polymerizes with radical or ionic initiators, and only a few examples of polymerization have been reported in which the polymerization takes place under the following special conditions.

(1) The process of obtaining a brown-colored resinous polymonoallylamine (hereinafter simply referred to as "polyallylamine") by the gas phase polymerization using tetrafluorohydrazine as a catalyst (U.S. Pat. No. 3,062,798);

(2) The process of obtaining a black-brown colored, resinous polyallylamine hydrochloride having a molecular weight of 950-1,000 by adding a small amount of water to monoallylamine hydrochloride to bring it into a state of aqueous melt at 80°-85° C. and then polymerizing it while adding hydrogen peroxide in small portions [V. V. Zycova et al., Tr. Inst. Khim. Nauk, Akad, Nauk Kaz. SSR 11, 89-94 (1964); Chem. Abst. 61, 14855 (1964)].

(3) The process wherein monoallylamine hydrochloride is dissolved into a mixed solvent of tertbutyl alcohol and chlorobenzene in the coexistence of diethyl phosphite and then subjected to polymerization at a reflux temperature of the solvent using azobisisobutyronitrile as an initiator (see German Laid-Open No. 2946550 and its Japanese counterpart, Japanese Laid-Open No. 82807/1981).

The above-mentioned processes (1), (2) and (3) are examples of polymerization of monoallylamine in which catalysts such as radical initiators are used. However, in the processes (1) and (2), the polymers obtained are viscous and resinous and no polymer having a high degree of polymerization is obtained.

The process (3) disclosed in the German Laid-Open Gazette relates to homo- and copolymerization of monoallylamine hydrochloride. In the German patent Specification, all working examples except one mentioned at page 36 thereof are those of copolymerizing monoallylamine hydrochloride with a polymerizable vinyl monomer such as acrylamide, acrylic acid, acrylic acid ester and acrylonitrile. In the only one example of homopolymerization of monoallylamine hydrochloride disclosed at page 36 thereof, polyallylamine hydrochloride was obtained at a yield of 85%. However the German Laid-Open Gazette does not mention the properties and the polymerization degree of the polymer obtained but only discribes that it is water-soluble over the whole pH range. The present inventors have repeated the homopolymerization of monoallylamine hydrochloride disclosed at page 36 of the German Laid-Open Gazette and observed that in opposition to said disclosure, only a hygroscopic low molecular weight product was obtained at a low yield of about 0.6%. In this connection, no working example of homopolymerization of monoallylamine hydrochloride is found in the Japanese Laid-Open No. 82807/1981 which is the Japanese counterpart of the German Laid-Open Gazette.

The following radiation polymerization processes have also been proposed as processes for polymerizing monoallylamine. The monoallylamine polymers obtained by these processes have a higher degree of polymerization than that of the polymers obtained by the processes using radical type catalysts.

(4) The process of polymerizing monoallylamine in a protic acid (sulfuric acid, phosphoric acid or hydrochloric acid) while irradiating it with gamma rays or while irradiating it with ultraviolet rays in the presence of hydrogen peroxide [V. A. Kabanov et al., Vysokomol. Soed., 18, No. 9, 1957-1962 (1976); 18, No. 10, 2233-2238 (1976)].

(5) The process of irradiating monoallylamine, allyl cyanide or allylmercaptan with a variety of radiations (gamma rays, electron beams, X rays, ultraviolet rays) in the presence of an inorganic acid or an inorganic acid salt of a metal belonging to Group I or II of the periodic table (L. S. Polak, V. A. Kabanov et al., USSR Pat. No. 296,423). Though this USSR Patent includes polymerization processes using radical type catalysts, examples of the patent involve no case of polymerizing monoallylamine with radical type catalyst, only referring to a process of polymerizing allyl cyanide with benzoyl peroxide in the presence of zinc chloride and a process of polymerizing allylmercaptan with hydrogen peroxide in the presence of calcium chloride.

On the other hand, since polyallylamine is a practically quite interesting polymer, there have been made attempts to produce polyallylamine or its N-alkyl-substituted derivatives by the chemical modification of other vinyl polymers. As examples of such attempts, the followings can be referred to:

(6) The process of producing polyallylamine by hydrogenating polyacrylonitrile latex (U.S. Pat. No. 2,456,428);

(7) The process of synthesizing polyallylamine by the reduction of polyacrolein-oxime [Yoshikazu Hatsuhama et al., Kogyo Kagaku Zasshi 64, No. 3,595 (1961)];

(8) The process of obtaining a polymer of allyltrimethylammonium chloride by reacting an allyl chloride polymer having a molecular weight of about 900 with trimethylamine (U.S. Pat. No. 4,053,512); and (9) The process of producing poly-(N,N-dimethylallylamine) by reducing a polymer of N,N-dimethylacrylamide (the same patent as above).

Among the nine processes for producing monoallylamine polymer or its N-alkyl-substituted derivatives mentioned above, the radiation polymerization processes with gamma rays in protic solvents mentioned in (4) and (5) are relatively preferable. As is well known, however, radiation polymerization process is not suitable as a process for producing a large maount of polymer, and at the present stage there is no case of industrially producing a polymer by radiation polymerization process. Thus, polyallylamine is not produced industrially even today, whereas monoallylamine has been industrially produced from many years ago.

An object of this invention is to provide a process for producing a polymer of monoallylamine, having a high degree of polymerization, by using a radical initiator.

Other and further objects, features and advantages of this invention will appear more fully from the following description.

SUMMARY OF THE INVENTION

As a result of searching for processes of producing a monoallylamine polymer of high polymerization degree in a high yield by radically-polymerizing monoallylamine under conditions of easy industrial applicability, the present inventors found that the use of an azo type initiator represented by the following structural formula (I) enables easy polymerization of an inorganic acid salt of monoallylamine in a polar solvent and thereby a polymer of an inorganic acid salt of monoallylamine having a high polymerization degree can be obtained in a high yield. Based on this finding, the present invention has been accomplished.

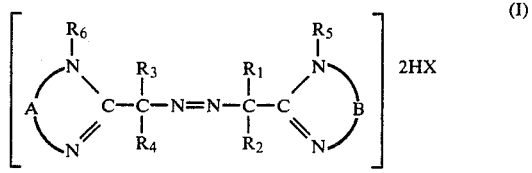

[In the formula (I), A and B independently are an alkylene group of 2 to 3 carbon atoms, which may have one or more substituents on the carbon atom or atoms; $R_1$, $R_2$, $R_3$, $R_4$, $R_5$ and $R_6$ may be same or different and independently are a hydrogen atom or a hydrocarbon group; and X is a monovalent anion selected from the group consisting of Cl, Br, $NO_3$, $HSO_4$, $H_2PO_4$, $HSO_3$, HCOO,

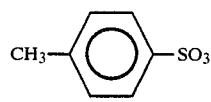

and $CH_3SO_4$.]

That is, the present invention relates to a process for producing a polymer of an inorganic acid salt of monoallylamine which comprises polymerizing an inorganic acid salt of monoallylamine in a polar solvent in the presence of a radical initiator represented by the general formula (I) shown above.

BRIEF DESCRIPTION OF THE DRAWING

FIG. 1 is a $^1$H-NMR spectrum of a monoallylamine polymer obtained by the process of the present invention.

PREFERRED EMBODIMENTS OF THE INVENTION

As the inorganic acid salt of monoallylamine used in the present invention, a hydrochloride, a sulfate, a sulfite, a phosphate, etc. are preferred.

Polymerization is conducted in a polar medium such as water, an inorganic acid (hydrochloric acid, sulfuric acid, phosphoric acid, polyphosphoric acid or the like), an aqueous solution of such an inorganic acid, an aqueous solution of a metal salt of an inorganic acid ($ZnCl_2$, $CaCl_2$, $MgCl_2$ or the like), an organic acid (formic acid, acetic acid, propionic acid, lactic acid or the like), an aqueous solution of such an organic acid, a polar organic solvent (an alcohol, an aprotic solvent such as dimethylsulfoxide or dimethylformamide) or an aqueous solution of such a polar organic solvent.

In polymerization, an inorganic acid salt of monoallylamine is ordinarily used in the form of an isolated crystal. Alternatively, monoallylamine and an inorganic acid may be added to a polar solvent to form a salt in the solvent. Needless to say, when an inorganic acid or a aqueous solution of the acid is used as a polymerization medium, a predetermined quantity of monoallylamine is added to an inorganic acid or an aqueous solution of the acid and polymerization can be conducted without further adding a polar solvent.

As the initiator represented by the general formula (I) used in the present invention, the following compounds are particularly preferred.

(a) 2,2'-Azobis-[2-(imidazolinyl)propane]dihydrochloride (b) 2,2'-Azobis-[2-(imidazolinyl)butane]dihydrochloride (c) 2,2'-Azobis-[2-(imidazolinyl)-4-(methyl)-pentane]dihydrochloride

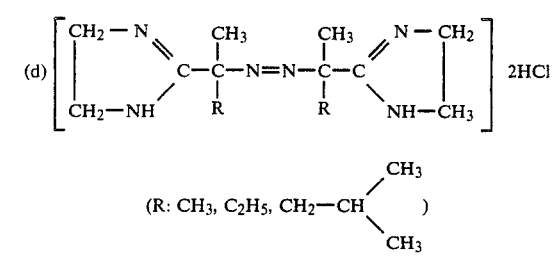

(e) 2,2'-Azobis-[2-(3,4,5,6-tetrahydropyrimidinyl)propane]dihydrochloride (f) 2,2'-Azobis-[2-(3,4,5,6-tetrahydropyrimidinyl)butane]dihydrochloride

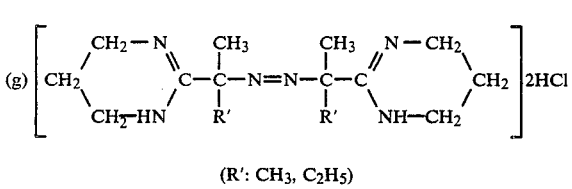

(R': $CH_3$, $C_2H_5$)

and, corresponding sulfates, phosphates, nitrates, acetates, etc. of the compounds (a) to (g).

Next, the present invention will be explained in more detail by way of Examples. In the following Examples, monoallylamine (hereinunder to be abbreviated to MAA) used as a monomer material was a fraction having a boiling point of 52.5° to 53° C. obtained by drying MMA manufactured by Shell Chemical Co., USA on granular sodium hydroxide and then rectifying it under nitrogen. This fraction contained neither diallylamine nor triallylamine.

EXAMPLE 1

This Example mentiones a case of producing a polyallylamine hydrochloride by polymerizing MAA hydrochloride (hereinunder to be abbreviated to MAA-HCl) in an aqueous solution.

To 1.1 kg of concentrated hydrochloric acid (35% by weight) wea added dropwise 570 g (10 moles) of MAA with stirring and ice-cooling to 5 to 10° C. After completion of the dropping, water and excess hydrogen chloride were removed by distillation at 60° C. under a reduced pressure of 20 mmHg by the use of a rotary evaporator, whereby a white precipitate was obtained. This crystal was dried on a silica gel for drying use at 80° C. under a reduced pressure of 5 mmHg to obtain 980 g of MAA-HCl. This MAA-HCl contained about 5% of water.

590 g (6 moles) of the above MAA-HCl and 210 g of distilled water were placed in a 2 liter round bottomed flask equipped with a stirrer, a thermometer, a reflux condenser and a nitrogen gas-introducint tube. They were stirred for dissolution to obtain a 70% aqueous MAA-HCl solution. With introducing nitrogen gas, the solution was heated to 50° C. Then, 15 g of an azo type initiator of the present invention, namely, 2,2'-azobis-[2-(imidazolinyl)propane]dihydrochloride (hereinunder to be abbreviated to initiator 1) was dissolved in 30 ml of water, and this solution was added to the above mentioned aqueous MAA-HCl solution heated at 50° C. Because heat generation started in about 30 min, this new solution was kept at 48° to 52° C. by cooling with stirring. When the heat generation ended in about 10 hr since the addition of the initiator, stirring was stopped. Then, the solution was subjected to standing polymerization at 50°±1° C. for 70 hr, whereby a colorless, transparent, viscous solution was obtained. Addition of this viscous solution to a large quantity of methanol produced a precipitate of a white polymer. This precipitate was separated by filtration through a glass filter and washed with methanol. The resulting precipitate was finely ground without drying and subjected to 15 hr extraction with methanol by the use of a Soxhlet extractor to remove unpolymerized MAA-HCl. The precipitate after extraction was dried at 50° C. under reduced pressure to obtain 563 g (95%) of a polymer. This polymer was subjected to elemental analysis and NMR spectrometory (in heavy water, 270 MHz).

The NMR spectrum of the polymer obtained is shown in FIG. 1. In FIG. 1, (a), (b) and (c) are thought to be absorption peaks of protons having the same symbols in the following general formula.

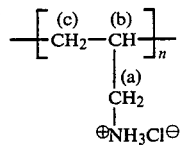

Thus, it was confirmed that the polymer is a polyallylamine hydrochloride (hereinunder to be abbreviated to PAA-HCl).

From the results of the elemental analysis, this PAA-HCl is thought to have about 1 mole of adsorbed water per 4 monomer units.

Measured: C 36.82%, H 8.78%, N 13.86%.
$C_3H_8NCl$ (Calc.): C 38.51%, H 8.62%, N 14.97%.
$C_3H_8NCl \cdot \frac{1}{4}H_2O$ (Calc.): C 36.74%, H 8.74%, N 14.28%.

The PAA-HCl had a weight average molecular weight $\overline{M}w$ of about 11,000 as measured by equilibrium precipitation method (ultracentrifugal analysis) in 3.5 M aqueous sodium chloride solution.

The PAA-HCl was readily soluble in water and aqueous acid solutions, however, insoluble in organic solvents. The viscosity of an aqueous solution of the PAA-HCl showed the typical behavior of polyelectrolytes.

This PAA-HCl, when heated in air, decomposed at a temperature of 300° C. or higher without melting.

Next, a free polyallylamine (PAA) was prepared from the PAA-HCl. That is, 30 g of the PAA-HCl was dissolved in 270 g of distilled water. The solution was passed through a strongly basic ion exchange resin (Amberlite IRA-402) to remove hydrogen chloride. The filtrate was freeze-dried to obtain 15.8 g of a white PAA. This PAA was readily soluble in water and methanol and was swollen by dimethylsulfoxide and pyridine, however, was insoluble in ordinary organic solvents. The PAA, when allowed to stand in air, absorbed carbon dioxide and water to form a carbonate.

EXAMPLE 2

Polymerization was conducted in the same manner as in Example 1, except that 2,2'-azobis-[2-(imidazolinyl)-butane]dihydrochloride (initiator 2) was used in this Example in place of the initiator 1 used in Example 1 and an aqueous solution of the initiator 2 (15 g of the initiator 2 dissolved in 30 ml of water) was not added in one time at the start of polymerization but added in two times (at the start of polymerization and after 30 hr). As a result, 504 g (85%) of a PAA-HCl was obtained. The PAA-HCl had a weight average molecular weight $\overline{M}w$ of 9,000.

EXAMPLE 3

49 g (1/2 mole) of MAA-HCl synthesized in accordance with the procedure described in Example 1 was dissolved in 31 g of a 60% aqueous zinc chloride solution. This solution was placed in a stoppered 100 ml Erlenmeyer flask and heated to 50° C. Therein was dissolved 1.5 g of the initiator 1 powder. Standing polymerization was conducted at 50°±1° C. for 40 hr. The solution solidified and became a colorless, transparent, rubber-like mass. The mass was dissolved in 200 g of water. The resulting solution was added to a large quantity of methanol to cause precipitation. The resulting precipitate was collected by filtration, subjected to methanol extraction by the use of a Soxhlet extractor and dried at 50° C. under reduced pressure to obtain 47 g (96%) of a PAA-HCl. This polymer had a weight average molecular weight $\overline{M}w$ of 10,500.

EXAMPLE 4

In the 2 liter polymerization vessel used in Example 1 (equipped with a dropping funnel in place of a nitrogen-introducing tube) there was placed 613 g (5 moles) of 80% sulfuric acid. Thereto was added dropwise 285 g (5 moles) of MAA with cooling and stirring. After completion of the dropping, the mixture was heated up to 50° C. to obtain a uniform solution. To this solution was added a solution prepared by dissolving 8.8 g of the initiator 1 in 10 ml of distilled water. Then, polyrization was conducted for 60 hr with maintaining 50°±2° C., whereby a colorless, transparent, viscous solution was obtained. The solution was added to a large quantity of water, whereby a polymer appeared in the form of thick malt syrup-like precipitate. The precipitate was thoroughly washed with water and dissolved in 900 ml of concentrated hydrochloric acid. The resulting solution was added to a large quantity of methanol to precipitate a PAA-HCl. This precipitate was collected by filtration, dried and again dissolved in 500 ml of 15% hydrochloride acid. The solution was added to methanol for reprecipitation. The precipitate obtained was dried at 50° C. under reduced pressure to obtain 440 g (yield: 90%) of a PAA-HCl. This polymer had a weight average molecular weight $\overline{M}w$ of 8,500.

EXAMPLE 5

49 g (½ mole) of MAA-HCl synthesized in accordance with the procedure described in Example 1 was dissolved in 31 g of a 70% aqueous zinc chloride solution. The solution was placed in a stoppered 100 ml Erlenmeyer flask and heated to 70° C. By introducing nitrogen gas, the air in the flask was replaced by the nitrogen gas. Thereto was added a solution of 1.5 g of 2,2'-azobis-[2-(3,4,5,6-tetrahydropyrimidinyl)propane]-dihydrochloride (initiator 3) dissolved in 3 g of distilled water. Standing polymerization was conducted at 60°±1° C. for 40 hr, whereby a viscous solution was obtained. Thereto was added 30 g of distilled water for dilution. The diluted solution was added to a large quantity of methanol to precipitate a polymer. The precipitate was collected by filtration, subjected to methanol extraction by the use of a Soxhlet extractor and dried at 50° C. under reduced pressure to obtain 40 g (81%) of a PAA-HCl. This polymer had a weight average molecular weight $\overline{M}w$ of about 7,000.

EXAMPLE 6

This Example is a case of polymerization in 85% phosphoric acid. In the 2 liter polymerization vessel used in Example 1 (equipped with a dropping funnel in place of a nitrogen-introducing tube) there was placed 1,150 g (10 moles) of 85% phosphoric acid. Thereto was added dropwise 285 g (5 moles) of MAA with stirring. At this time, the temperature was kept at 10° to 30° C. (At temperatures higher than 30° C., there is a possibility of partial evaporation of MAA. At temperatures lower than 10° C., MAA phosphate precipitates as a crystal.) After the dropwise addition, the mixture was heated up to 50° C. with stirring, whereby a phosphoric acid solution containing MAA phosphate was obtained. Thereto was added a solution of 4.7 g of the initiator 1 dissolved in 10 ml of distilled water. Polymerization was conducted for 70 hr with maintaining the temperature at 50°±2° C. by absorbing the heat generated, whereby a colorless, transparent, viscous solution was obtained. This solution was added to a large quantity of water. A polymer precipitated in the form of rice cake. This precipitate was thoroughly washed with water and then dissolved in 550 ml of concentrated hydrochloric acid. The resulting solution was added to a large quantity of methanol to precipitate a PAA-HCl. The precipitate was collected by filtration and subjected to extraction by the use of a Soxhlet extractor to remove an unpolymerized monomer and phosphoric acid. The precipitate thus treated was dried at 50° C. under reduced pressure to obtain 417 g (about 85%) of a PAA-HCl. This polymer had a weight average molecular weight $\overline{M}w$ of 110,000 as measured by the same method as in Example 1.

What is claimed is:

1. A process for producing a polymer of an inorganic acid salt of monoallylamine which comprises polymerizing an inorganic acid salt of monoallylamine in a polar solvent in the presence of a radical initiator represented by the following general formula (I)

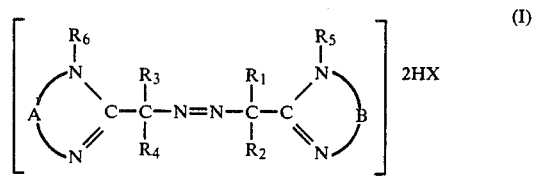

[In the above formula, A and B independently are an alkylene group of 2 to 3 carbon atoms which may have one or more substituents on the carbon atom or atoms; $R_1$, $R_2$, $R_3$, $R_4$, $R_5$ and $R_6$ may be same or different and independently are a hydrogen atom or a hydrocarbon group; and X is a monovalent anion selected from the group consisting of Cl, Br, $NO_3$, $HSO_4$, $H_2PO_4$, $HSO_3$, HCOO, $CH_3COO$,

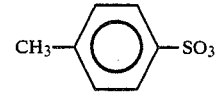

and $CH_3SO_4$.]

2. A process according to claim 1, wherein the inorganic acid salt of monoallylamine is selected from the group consisting of a hydrochloride, a sulfate, a sulfite and a phosphate.

3. A process according to claim 1, wherein the polar solvent is selected from the group consisting of water, inorganic acids, aqueous solutions of inorganic acids, aqueous solutions of metal salts of inorganic acids, organic acids, aqueous solutions of organic acids, alcohols, aqueous alcohol solutions, aprotic solvents and aqueous solutions of aprotic solvents.

* * * * *